(12) United States Patent
Maes (10) Patent No.: US 8,322,864 B2
(45) Date of Patent: Dec. 4, 2012

(54) DUAL TIR PRISM ARCHITECTURE TO ENHANCE DLP PROJECTORS

(75) Inventor: Dirk L. A. Maes, Lauwe (BE)

(73) Assignee: Barco N.V., Kortrijk (BE)

( * ) Notice: Subject to any disclaimer, the term of this patent is extended or adjusted under 35 U.S.C. 154(b) by 157 days.

(21) Appl. No.: 12/665,237

(22) PCT Filed: Jun. 18, 2008

(86) PCT No.: PCT/EP2008/057737
§ 371 (c)(1),
(2), (4) Date: Dec. 17, 2009

(87) PCT Pub. No.: WO2008/155367
PCT Pub. Date: Dec. 24, 2008

(65) Prior Publication Data
US 2010/0189344 A1     Jul. 29, 2010

(30) Foreign Application Priority Data

Jun. 18, 2007 (GB) .................................. 0711641.1

(51) Int. Cl.
*G03B 21/28* (2006.01)
(52) U.S. Cl. ................. 353/81; 363/30; 363/31; 363/33; 363/34; 363/38; 363/52; 363/98; 363/99; 359/222.1
(58) Field of Classification Search ............... 353/30, 353/31, 33, 34, 38, 52, 81, 98, 99, 122; 359/638, 359/261, 263, 317–318, 633, 636; 348/744, 348/745, 748, 750, 756; 349/5, 7, 8, 9, 30
See application file for complete search history.

(56) References Cited

U.S. PATENT DOCUMENTS

| | | | | |
|---|---|---|---|---|
| 5,621,486 | A * | 4/1997 | Doany et al. ................. | 348/756 |
| 6,382,799 | B1 * | 5/2002 | Nishikawa et al. ........... | 353/122 |
| 6,663,243 | B2 * | 12/2003 | Fielding et al. ................ | 353/31 |
| 7,207,678 | B2 * | 4/2007 | Penn .............................. | 353/81 |

(Continued)

OTHER PUBLICATIONS

Examination Report of EPO regarding EP 08 761 185.1-1522, Apr. 6, 2010.
International Preliminary Report on Patentability in PCT/EP2008/057737, Dec. 22, 2009.
Murat, H. et al., "Increased Lumens Per Étendue by Combining Pulsed LED's", Proceedings of SPIE, vol. 5740, Bellingham, WA, (2005), 12 pages.

*Primary Examiner* — Georgia Y Epps
*Assistant Examiner* — Sultan Chowdhury
(74) *Attorney, Agent, or Firm* — Bacon & Thomas, PLLC (57) ABSTRACT

A projection system incorporating a prism with dual total internal reflection function, to increase the performance of DLP™ projection, by offering a solution to combine 2 light paths to contribute to the brightness on the screen and at the same time rejecting flat-state and off-state light from entering the projection lens thereby enhancing contrast. In one implementation those two light paths can be collecting light from 2 different light sources which are driven in a pulsed manner with a duty cycle of approximately 50% for each of the two light sources at increased power. In a second implementation with a color sequential single DMD™ projector, while one light path passes a primary color the second light path passes the complementary secondary color. A special color transformation algorithm is proposed to transform the image input signals to make optimal use of the capabilities offered by the second implementation, and create maximum brightness and color saturation of the image.

20 Claims, 7 Drawing Sheets

U.S. PATENT DOCUMENTS

| | | | |
|---|---|---|---|
| 7,300,156 B2 * | 11/2007 | Lerner et al. | 353/31 |
| 7,437,034 B2 * | 10/2008 | Gerets et al. | 385/36 |
| 7,518,803 B2 * | 4/2009 | Sawai et al. | 359/638 |
| 2002/0163625 A1 * | 11/2002 | Tabuchi et al. | 353/31 |
| 2005/0128441 A1 * | 6/2005 | Morgan | 353/102 |
| 2006/0044521 A1 * | 3/2006 | Vandorpe et al. | 353/33 |
| 2006/0098309 A1 * | 5/2006 | Chen et al. | 359/833 |
| 2006/0285087 A1 | 12/2006 | Huang | |
| 2007/0014114 A1 * | 1/2007 | Barazza | 362/297 |
| 2008/0174745 A1 * | 7/2008 | Robitaille | 353/85 |

* cited by examiner

DUAL TIR PRISM ARCHITECTURE TO ENHANCE DLP PROJECTORS

The present invention is in the technical field of projector illumination technology and in particular relates to methods, apparatus and controllers for projection systems.

BACKGROUND OF THE INVENTION

Efficient use of the light source, in most cases an arc lamp is important for cost efficient implementation of high brightness projectors. The use of ever smaller micro-displays creates a demand for light sources with a lower etendue, or in the case of an arc lamp a smaller arc gap. Especially for higher power lamps such a smaller arc gap cannot be achieved unless at the cost of a significant reduction of the lamp life. When combining multiple light sources to increase the brightness the etendue of the light sources add up so that efficiency drops and the effective brightness increase from adding a light source is less then the expected multiple of a single light source output.

More particularly, the present invention is in the technical field of DLP™ projection technology, such as e.g. based on the Texas Instruments digital micro-mirror device DMD™. This DMD consist of a 2-dimensional array of microscopic mirrors that can tilt to two positions typically plus or minus 10 to 12 degrees from an undriven flat position. This way each pixel in the chip can direct the light that hits it in either the 'on state' or the 'off state'. The on-state light reaches the screen through the projection lens and gives a bright pixel, while the off state light is absorbed inside the projector; this results in a dark pixel. Fast transitions between the two states in a pulse width modulation scheme are used to create a pixel with desired intensity level.

High-end applications use 3 DMD's: one for the red, green and blue light. Colours are split and recombined by using colour prism architecture. This configuration offers the best light-output and saturated colours.

Low-end applications use a single DMD that sequentially generates the different colour components. The sequence of colours from a white light source is usually obtained by means of a rotating colour wheel. This colour wheel will pass one spectral primary band from the white light source while reflecting the other spectral components. Typically red, green and blue spectral bands are passed sequentially. Since ⅔ of the light from the light source is rejected the efficiency of a single-DMD system is much lower then the efficiency of a 3-DMD system. In some applications a white segment is added to the colour wheel to increase the brightness in white. However the brightness of the pure primary (red, green and blue) colours and pure secondary (yellow, cyan and magenta) colours obtained thereby remains unchanged, so that adding a white segment results in a loss of colour saturation.

In both of the above architectures a total internal reflection or TIR prism is used to reflect the incoming light from the light source to the DMD while passing the light that bounces off the DMD.

The prior art in such technical field includes publications that suggest the use of pulsed LED light sources to increase the lumens output of a projection device; such as the article "increased lumens per etendue by combining pulsed LED's" published in the proceedings of SPIE Vol. 5740. The suggested solutions however require the use of additional moving elements or switchable retarders, both difficult to implement especially with large and high power lamp light sources. Also the implementation suggested with the switchable retarders relies on the polarization of the light source, a solution that is only efficient when the display device operation is based on the use of polarized light, which is not the case for DLP™ projection technology.

BRIEF SUMMARY OF THE INVENTION

It is an object of the present invention to provide good methods and systems for displaying. It is an advantage of embodiments according to the present invention that the performance of a DLP™ projection system can be increased. In some embodiments the latter may be done by offering a solution to combine 2 light paths to contribute to the brightness on the screen. In other embodiments this may be by offering a good way of removing unwanted light from the system.

The above identified object is obtained using a system or method as described, below and/or in the independent claims. Particular embodiments of the present invention are as set out in the dependent claims and/or in the detailed description.

The present invention in one aspect relates to a display or projection system, also referred to as imaging system, for displaying an image, the system comprising at least one light source and at least one micro-mirror device, the system furthermore comprising a dual total internal reflection prism for guiding light between the at least one light source and the at least one micro-mirror device.

The present invention also relates to a dual total internal reflection (TIR) prism for use within a projector with at least one micro-mirror device.

The present invention furthermore relates to a method for generating an image in an imaging system with at least one micro-mirror device, e.g. based on combining pulsed light sources, wherein the micro-mirror device simultaneously performs the function of selecting the active light source and the imaging function.

The present invention also relates to a method for generating an image in a display or projection system, e.g. in a colour sequential way, the method comprising selecting on a pixel basis between a first light beam comprising a temporal sequence of primary colours and a second light beam comprising a temporal sequence of the corresponding substantially complementary light in the first light beam and using an associated colour mixing algorithm to select a predetermined brightness and colour saturation for the display or projection system. The associated colour mixing algorithm may determine for a plurality of predetermined colour a combination of primary and secondary colours to be imaged for obtaining that predetermined colour. The combination may depend on the position of the predetermined colour in the CIE colour triangle, e.g. whether it is positioned in the triangle determined by the secondary colours or in parts of the triangle determined by the primary colours and not in the triangle determined by the secondary colours.

The present invention also provides a method for imaging an image with an imaging system, e.g. achieving a full colour image in a display or projection system in a colour sequential way, the method comprising:

selecting on a pixel basis between a first light source with a first light spectrum, e.g. primary light spectrum and a second light source with a second light spectrum, e.g. a secondary light spectrum being for example substantially complementary to the first light spectrum, e.g. with both light sources being active at the same time, and using an associated colour mixing algorithm to select a predetermined brightness and colour saturation for the system.

In one exemplary implementation those two light paths can be collecting light from 2 different light sources which are driven in a pulsed manner with a duty cycle of approximately 50% at increased power. To create a white image the DMD will sequentially direct the light of the first light source to the projection lens when this first lamp is active or direct the light of the second light source to the projection lens when the second light source is active. In this sequential mode of operation the light sources can be combined without increasing the etendue such that the efficiency from the combination of the lamps is as good as the efficiency of a single lamp and the light output can be effectively doubled compared to a single lamp system. The combination is made without the introduction of additional moving elements or polarization switching elements. The DMD is serving simultaneously as the light switch to select the active light source, and as the imaging device. This approach can be applied to both single-chip and 3-chip DLP™ projectors.

In a second exemplary implementation with a single DMD™ the two light paths carry light originated from the same light source. The light of the light source is split such that the first light path passes the part of the spectrum to create a primary colour while the second light path passes all or part of the remaining spectrum to create the complementary secondary colour. Depending upon the desired colour for a certain pixel the DMD™ will select the light from the first light path for a first amount of time and the second light path for a second amount of time. Optionally the DMD will not select any of the light paths for a third amount of time by putting the mirrors in the flat-state position, to create a full colour image or grey scale image. To create white it is now possible to compose this of the secondary colours (yellow, cyan and magenta) rather then of the primary colours (red, green and blue) thereby using a typical ⅔ of the lamps energy rather then the typical ⅓ of the lamp energy in a conventional single chip system with an RGB colour wheel without white segment. Also the brightness of the secondary colours can be doubled while the brightness of the primary colours is identical to a conventional single chip system with an RGB colour wheel without white segment.

A special colour transformation algorithm is proposed to transform the image input signals to make optimal use of the capabilities offered by the second implementation, and create maximum colour saturation of the image.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Figure 1:
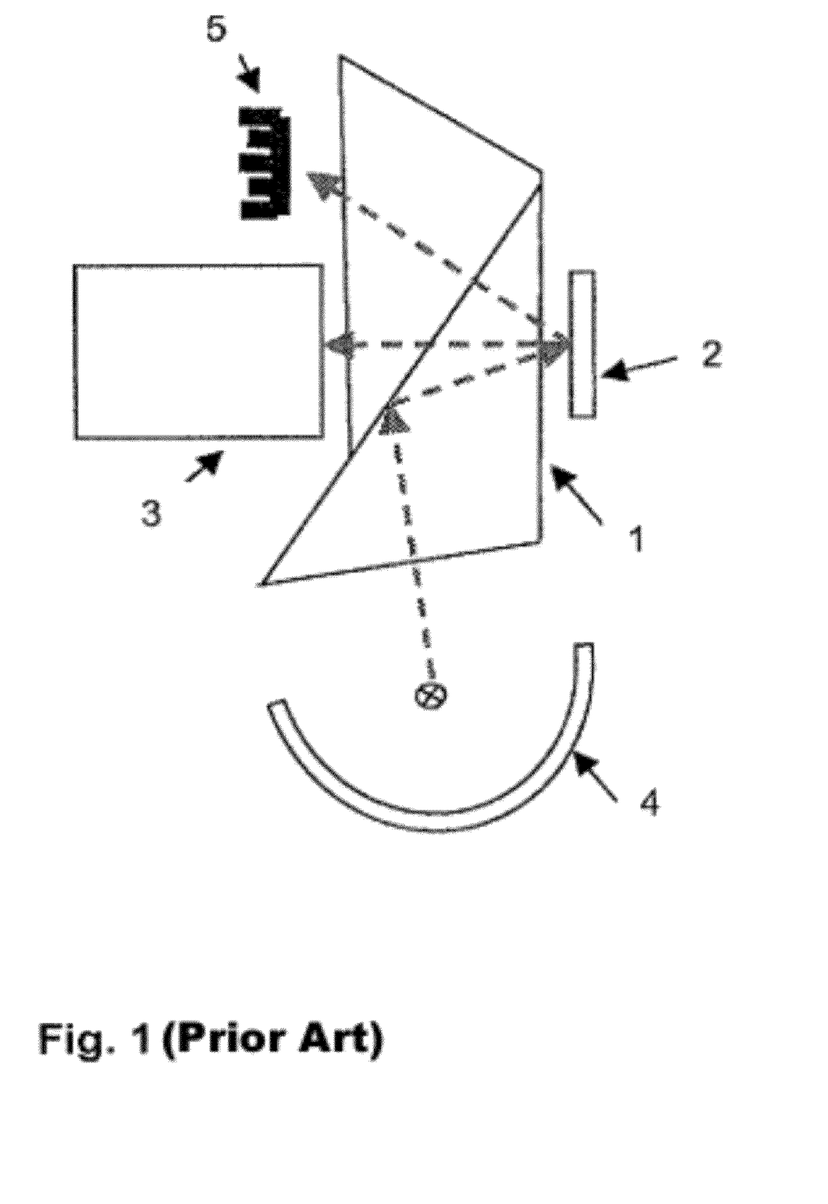
FIG. 1 is a schematic representation of a DLP™ projection system with a traditional TIR prism and a single light source.

The architecture shown in FIG. 1 is a known typical DLP projector architecture. A TIR (total internal reflection) prism (1) consisting of 2 glass blocks is used to direct the light coming in from the light source (4) at the bottom towards the DMD (2) under an angle of typically 20 or 24 degrees by total internal reflection. When the DMD pixel is in the on-state that means tilted a typical in −10 or −12 degrees position then the light is reflecting towards the projection lens (3). The TIR prism (1) is passing these light rays and is acting as a parallel glass block between the lens (3) and the DMD (2). When the DMD pixel is in the off-state that means tilted in a typical +10 or +12 degrees position then the light is bouncing off towards the top of the TIR prism and gets absorbed into an off-state heat sink (5).

Figure 2:
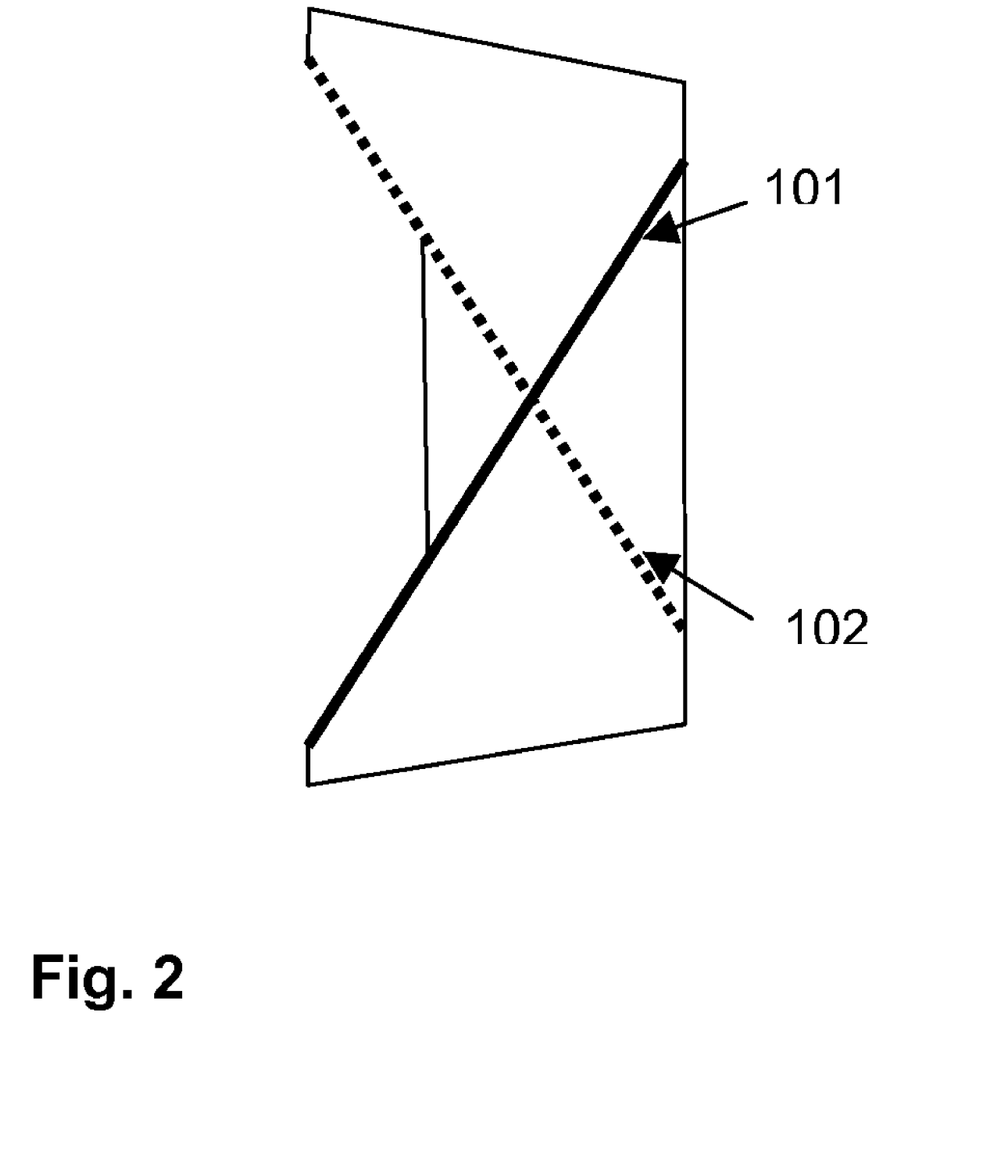
FIG. 2 is a side view of the dual TIR prism as can be used in embodiments according to the present invention.

In a first aspect, the present invention relates to the use of a dual total internal reflection prism in a projection or display system comprising at least one micromirror device, such as a digital micromirror. By way of example, the invention not limited thereto, FIG. 2 is showing a side view of a dual total internal reflection (TIR) prism as can be used in the present invention. It contains a first TIR surface (101) represented by the solid line and oriented like the TIR surface in the traditional TIR prism described above and a second TIR surface (102) represented by the dotted line. The second TIR surface thereby may be oriented as the vertical mirrored image of the first surface.

Figure 3:
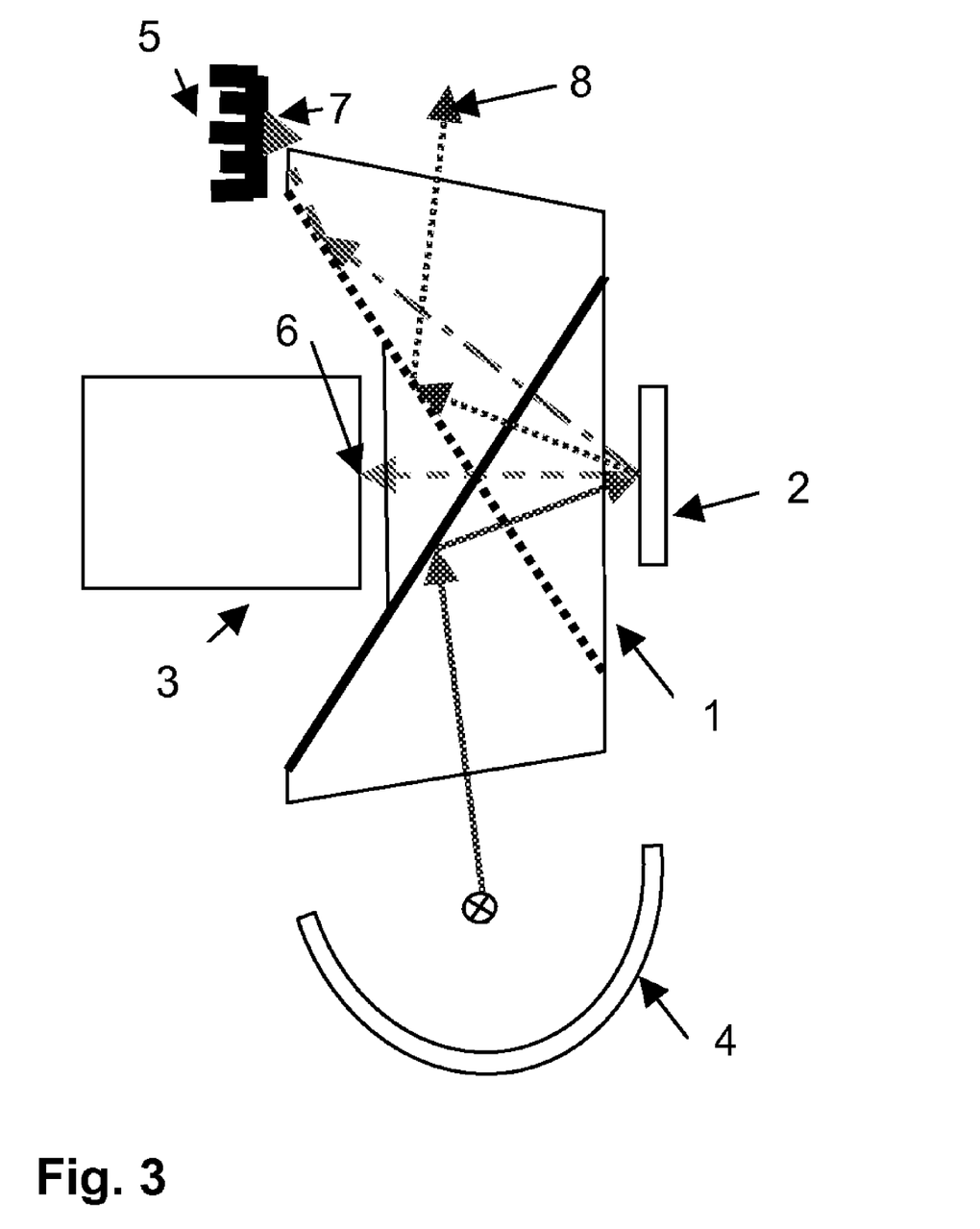
FIG. 3 is a schematic representation of a DLP™ projection system with a dual TIR prism and a single light source as can be used in embodiments according to the present invention.

In a second aspect, the present invention relates to a display system or projection system for displaying images. The system comprises at least one light source and at least one micro-mirror device. Such a micro-mirror advantageously can be used for modulating an incoming light beam and introduce image information. The micro-mirror device may be any type of digital light processing device available. The light source may be any suitable light source such as an arc lamp, a LED, a laser or any other lamp. The system furthermore comprises a dual total internal reflection prism for guiding light between the at least one light source and the at least one micro-mirror device. The dual total internal reflection prism advantageously may comprise a first total internal reflection surface and a second total internal reflection surface, different from the first total internal reflection surface. In one example, the dual TIR prism is used in combination with a digital mirror DMD (2) device as shown in FIG. 3 where the first TIR surface will direct the light from the light source (4) towards the DMD under an angle of typically 20 or 24 degrees by total internal reflection. When the DMD pixel is in the on-state, this means e.g. tilted in a typical in −10 or −12 degrees position, with reference to a plane parallel to the viewing plane, then the light is reflecting toward the projection lens (3). The TIR prism (1) is passing these on-state light rays (6) by both the first and the second TIR surface and is acting as a parallel glass block between the lens and the DMD (2). In other words, after reflection to the DMD, the light modulated as on-state is not further reflected by the prism and directed to the projection lens. The first total internal reflection surface thus may be positioned to reflect light from a light source to the digital mirror device. When the DMD pixel is in the off-state that means tilted in a typical +10 or +12 degrees position then the off-state light rays (7) are bouncing off towards the top of the TIR prism. There they will either directly exit the prism or exit the prism after total internal reflection by the second TIR surface and get absorbed into the off-state heat sink (5). The shape of the top of the TIR prism is optimized to allow the off-state light rays (7) to exit the prism. When the DMD pixel is in the flat-state, than the flat-state light rays (8) will be totally internally reflected by the second TIR surface and leave the prism at the top. Because the second TIR surface is discriminating between on-state light and flat-state light, flat-state light coming from the DMD backplane will not have the opportunity to enter the projection lens and via scattering reach the screen. The second total internal reflection surface thus may be positioned to direct unwanted light, e.g. from the flat state or the of-state, out of the system and/or away from the projection lens. Therefore the dual TIR structure is expected to reduce the stray light in the off-state and hence increase the overall contrast of the projection system compared to the architecture of FIG. 1

Figure 4:
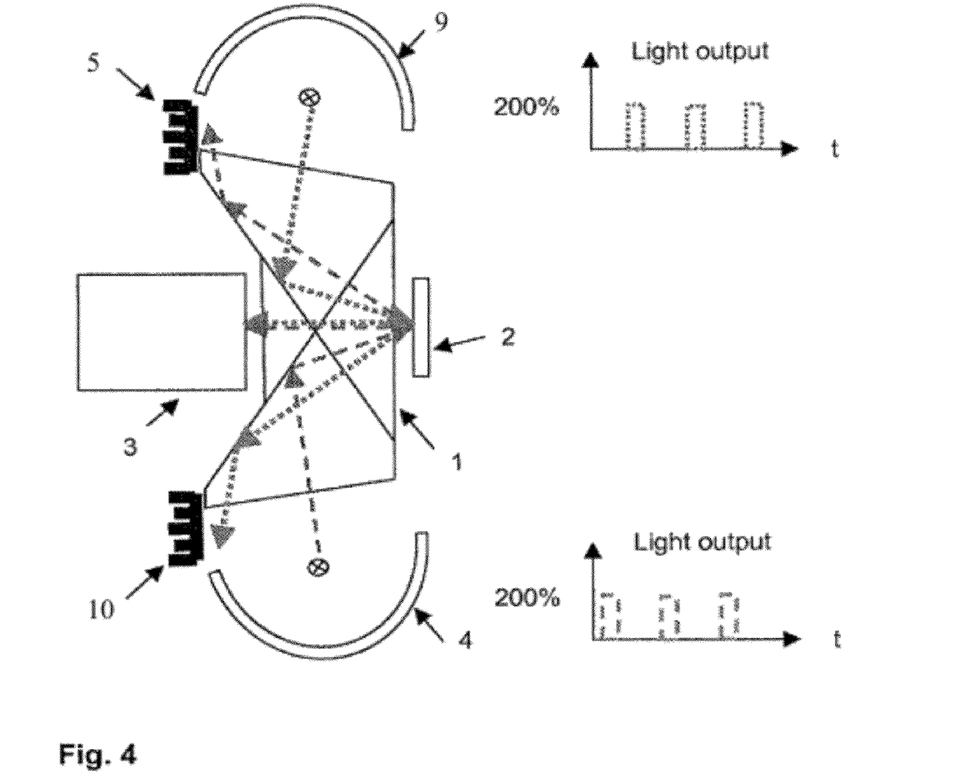
FIG. 4 is a schematic representation of a DLP™ projection system with a dual TIR prism combining two pulsed light sources according to an embodiment of the present invention.

In a particular embodiment, the dual total internal reflection prism is adapted, e.g. in position and in orientation of its total internal reflection surfaces, to guide light from two light sources to the at least one digital mirror device. The first total internal reflection surface may guide light from the first light source to the digital mirror device and direct light from off-state or flat-state digital mirror devices out of the system or away from the projection lens, e.g. to an absorber. The second total internal reflection surface may guide light from the second light source to the digital mirror device and direct light from off-state or flat-state digital mirror devices out of the system or away from the projection lens, e.g. to an absorber. As the at least one digital mirror device has an inverted function for light from the first light source and light from the second light source, advantageously the display or projection system may comprise a controller for synchronizing the driving of the at least one digital mirror device and the driving of the light sources. The light sources advantageously are driven in pulsed regime. The light sources advantageously are driven alternatively. By way of illustration, the present invention not limited thereto, FIG. 4 is showing an example of how a dual TIR prism (1) can be used to combine light from 2 light sources (4 and 9). When the first light-source (4) is active the light is directed towards the DMD (2) by the first TIR surface of the dual TIR prism (1) and the DMD (2) is operating in a normal way. When in the on-state the light is directed to the projection lens (3) when in the off-state the light is rejected towards the top heat sink (5), after total internal reflection by the second TIR surface. When the second light source (9) is active the second TIR surface of the dual TIR prism (1) will also direct that light towards the DMD (2). The DMD (2) is now operating in an inverse way. When in the traditional off-state position the light will be directed towards the projection lens (3) and when in the traditional on-state position the light will be directed towards the bottom heat sink (10) after total internal reflection by the first TIR surface. The light sources (4) and (9) are alternatively driven for a limited amount of time typically <=50%. The peak power is higher, typically 200%, while the average power per light source remains at 100%. So the DMD (2) device is selecting the active light-source while at the same time performing the function of imaging device capable of modulating per pixel the intensity of the light on the screen by pulse width modulation. The driving signal to the DMD (2) needs to be inverted when the top light source is active and passed in the normal way when the bottom light source is active. Note that when the DMD (2) is in the flat state, light could be circulated through the non-active light source. This could have negative effects on lamp life. Software protection could be implemented to avoid the lamps being active when the DMD is in the flat state or asymmetry should be implemented in the optical paths to avoid circulation. It is preferred that the repetition rate of the pulsing between the two light sources is high enough to obtain visual integration, in addition calibration could be provided to balance the light-output and color of the two light sources or to maintain a certain unbalance over time.

The principle architecture of FIG. 4 is showing a single chip DLP projection system. When the dual TIR prism is followed however by a colour splitting prism also 3-chip DLP architectures can be supported with the same architecture.

In single chip architecture the two optical paths could be driven by pulsed white light sources combined with synchronized colour wheels, where one could take advantage of the non-active period of the lamp to hide the spokes of the colour wheel. The colour wheel of the second light path then operates with a fixed phase relationship to the first colour wheel. During for example the red/green spoke of the first light pad the blue segment could be active in the second path. This way efficiency can be gained without compromising colour saturation with spoke light recapture. At the same time the colour sequence speed is doubled, reducing colour break-up. The 2 colour wheels could have identical of different spectral characteristics. The use of colour wheels with different spectral characteristics could be used to obtain a multi, primary wide colour gamut projector or to enable 3D stereoscopic projection where left and right image are sequentially generated with different spectral characteristics (know as active infitec 3D). The colour wheel could be replaced by other switchable colour filters such as the colorswitch from, colorlink.

The two optical paths could also be driven by multiple monochrome pulsed light sources such as LED or Laser. Both in colour sequential operation for single chip and color simultaneous operation for 3 chip architectures. The choice of monochrome colours could be identical for both paths or different in order to widen the gamut and/or to enable active infitec 3D.

Using the above dual TIR prism architecture a highly efficient single chip projector can be constructed that without the use of a white segment in the colour wheel can offer increased performance (approaching 3 chip performance) in terms of efficiency and colour saturation. The DMD device advantageously has three controllable states: on, off and flat.

Figure 5:
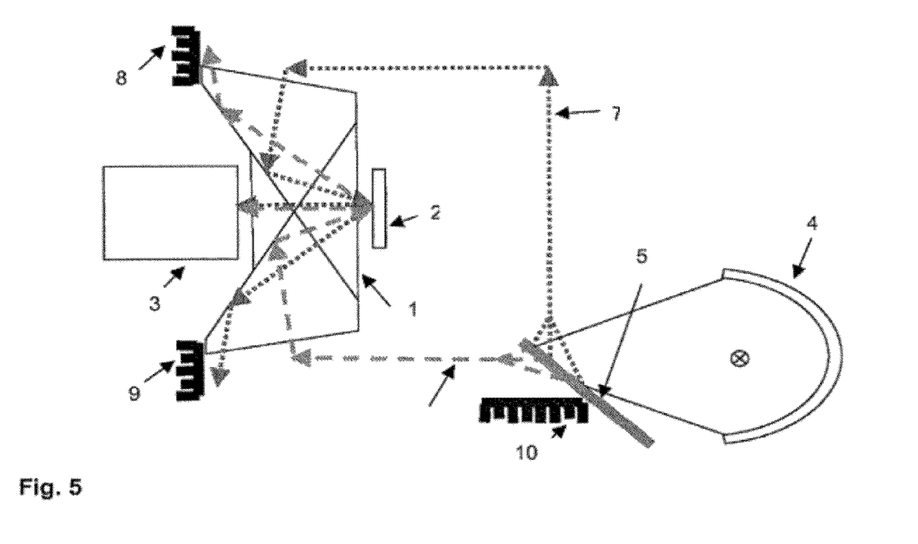
FIG. 5 is a schematic representation of a single chip DLP™ projection system using a colour wheel where a dual TIR prism is used to combine the light path of the primary colours with the light path of the secondary colours, according to an embodiment of the present invention.

In another particular embodiment the dual total internal reflection prism is used with one or more light sources whereby first light of the light source is directed on one optical path and second light of the light source is directed on a second optical path. The first light then is reflected at the first TIR surface to the micro-mirror device whereas the second light is reflected at the second TIR surface to the micro-mirror device. The micro-mirror device furthermore is driven such that a predetermined selection is made for selecting the first light and/or the second light. The micro-mirror device again functions as selection means between the first and second light. The micro-mirror device advantageously has three states, whereby the on-state directs first light to the viewing direction or projection lens and second light out of the viewing direction or projection lens, e.g. to an absorber, the off-state directs second light to the viewing direction or projection lens and first light out of the viewing direction or direction of the projection lens, e.g. to an absorber and the flat state directs both first light and second light out of the viewing direction or direction of the projection lens, e.g. to absorbers. The directed first light and second light may vary over time. The first light may e.g. be one of the primary colours or e.g. a time sequence of the primary colours (R, G, B) while the second light may e.g. be the corresponding secondary colours or e.g. a time sequence of the secondary colours (G&B, R&B, R&G). The first light may comprise a temporal sequence of the primary colours and the second light may be, e.g. at each time, the remaining part of the light spectrum after splitting off the primary colour. The first light and second light may be selected or splitted using a colour wheel or using any other suitable light selecting means. The display or projection system may comprise a controller for selecting whether the first light or the second light is directed to the projection lens or more generally in the viewing direction. By selecting the amount of first light and second light that is directed in the viewing direction, the total brightness can be controlled. An example of such a system, the invention not being limited thereto, is illustrated in FIG. 5 wherein the light from the light-source (4) is filtered by a colour wheel (11). The colour wheel is passing part of the spectrum from the light-source (4) into a first light-path (12) and is reflecting the remainder of the spectrum of the light-source (4) into a second light-path (13). The first light-path is directed towards one side, e.g. the bottom of the dual TIR prism (1) and the second light-path is directed towards another side, e.g. the top of the dual TIR prism (1). When the DMD (2) is in the traditional on-state, it will direct the light from the first light-path (12) towards the lens and direct the light from the second light-path (13) towards the bottom heat sink (10). When the DMD (2) is in the traditional off-state, it will direct the light from the second light-path (13) towards the lens (3) and direct the light from the first light-path (12) towards the top heat sink (5). When the DMD (2) is in the flat state, the light returned from the first light-path (12) will be totally internally reflected and will be returned into the second light path (13), but because of its spectral properties will pass the colour wheel (11) and get absorbed into flat-state heat sink (14); similarly the light from the second light path (13) will at the same time be totally internally reflected and returned into the first light path (12), but because of its spectral properties will be reflected by colour wheel (11) and therefore also absorbed into the flat-state heat sink (14). Since the flat state light will be subject to total internal reflection by the opposite TIR surface and does not reach the lens, this should improve the contrast ratio from what is normally achieved from flat state light. Still some margin should be taken in the illumination angle to allow for some hinge memory and switching oscillation to occur. The DMD can thus either send light from the first light path (12) or light from the second light path (13) to the lens (3), or none at all. When the colour wheel (11) is directing a primary colour (red, green or blue) to one light path it will at the same time direct the corresponding secondary colour (respectively cyan, magenta or yellow) to the other lightpath. This means that about ⅓ of the white light may be passed via the first path, ⅔ of the white light may be passed via the second path. By placing an additional colour notch filter in the primary, or secondary light path the saturation of primary respectively secondary colours can be enhanced to create a wider colour gamut. The colour wheel could be replaced by other switchable colour filters such as the colorswitch from colorlink.

Also the two optical paths (12 and 13) could be driven in color sequential mode by multiple monochrome pulsed light sources such as LED or Laser. Arranged such that when a certain primary color (red, green or blue) is active in one light path, the complementary secondary color (respectively cyan, magenta or yellow) is active in the other light path. This way it is possible to reduce the multiplexation ratio in systems with more than three primary colors.

In the third aspect, the present invention relates to a method for generating an image, using a system as described above. The method may make use of combined pulsed light sources in or used with an imaging system with at least one micro-mirror device. The method comprises using the micro-mirror device simultaneously for selecting the active light source, i.e. from which light source the light is used for imaging, and for performing the imaging function. In another aspect, the invention relates to a method for generating an image in a display or projection system, e.g. a colour image in a colour sequential way, whereby the method comprises selecting on a pixel basis between a first light beam and a second light beam, whereby the first light beam comprises a temporal sequence of primary colours and the second light beam comprises a temporal sequency of corresponding complementary light, complementary to the primary colours. The selecting thereby may be performed by using an associated colour mixing algorithm to select a predetermined brightness and colour saturation for the display or projection system. The method may comprise total internal reflection of light not selected to be imaged by the micro mirror device. Such total reflection may occur by selecting an off-state or a flat state of the at least one micro mirror device.

Figure 6:
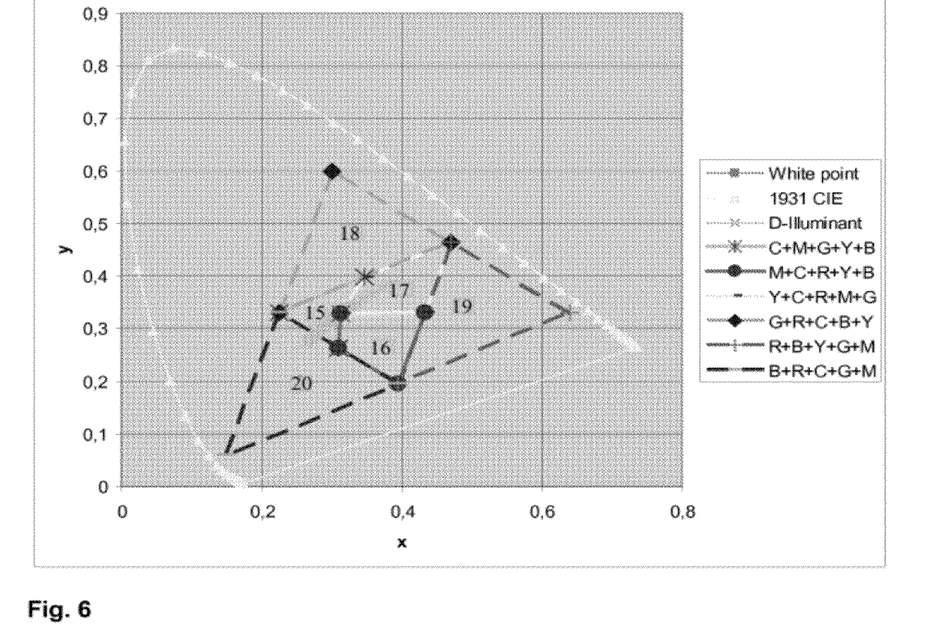
FIG. 6 is a representation of the colour gamut subdivided in 6 spaces, where for each of the 6 spaces a different combination of primary and secondary colours is selected to achieve colour mixing with maximum light efficiency, as can be used in embodiments of the present invention.

By way of example, the present invention not being limited thereto, a method is illustrated for generating different colours in a system as described above. In FIG. 6 it is shown how with the above architecture a colour sequential projection system can be made that uses a combination of primary and secondary colours to achieve every desired colour within the RGB gamut triangle. In one example, as much as possible the secondary colours will be used for colour mixing since they hold twice the energy of the primary colour. The white colour is reproduced as the sum of the secondary colours from the second light path. The primary colours are reproduced only by the primary colours from the first light path. The secondary colours however are produced as the sum of 2 primary colours from the first light path and the corresponding secondary colour from the second light path. Note that in this case the required secondary colour is available in the second channel at the time that the unused primary colour is presented in the first channel.

For other none pure colours a more complex colour mixing algorithm may be required. For every segment of the colour wheel there is a time that the first channel can be activated and a time that the second channel can be activated. Those time segments will be complementary.

Within the triangle made up by the secondary colours there is at least one secondary colour that will be selected 100% of the time while the other secondary colours will share time with the corresponding primary colour. C=Sec 1+x. Sec 2+(1−x). Prim 2+y. Sec 3+(1−y). Prim 3, with x and y predetermined time factors.

In area (15) a colour will be composed from cyan, magenta, green, yellow and blue components. In area (16) a colour will be composed from magenta, cyan, red, yellow and blue components. In area (17) a colour will be composed from yellow, cyan, red, magenta and green components. Outside the triangle of secondary colours there is one primary colour that will be selected 100% of the time while the other primary colours will share time with the corresponding secondary colour. C=Prim 1+x. Prim2+(1−x). Sec 2+y. Prim3+(1−y). Sec 3.

In area (18) a colour will be composed from green, red, cyan, blue and yellow components. In area (19) a colour will be composed from red, blue, yellow, green and magenta components. In area (20) a colour will be composed from blue, red, cyan, green and magenta components.

To calculate for example the portion of time during the red colour wheel segment where the first channel is selected (red) versus the second channel being selected (cyan) the following approach may for example be used. Draw a line through the desired colour point parallel to the green/blue side of the colour gamut triangle. Also draw a line from the cyan point to the red point and subdivide the space in between the white point and the crossing with the yellow magenta line linearly. Look at the point of intersection to determine the time division.

When "walking" from, the cyan point to the red point:
The space until the white point, the second channel (cyan) will be selected 100% of the time,
Then from the white point until the crossing with the magenta yellow line the first channel (red) will be selected for x % of the time and the second channel will be selected for (100−x) % of the time.
Beyond the crossing with the magenta yellow line, the first channel is selected 100% of the time.

To modulate the intensity of a colour, the mirror is put in the flat state for z % of the time. This is to be equally divided between the different colour components. When combined with spoke light recapture it is preferred to do this with the light of the second channel because of the higher intensity.

Figure 7:
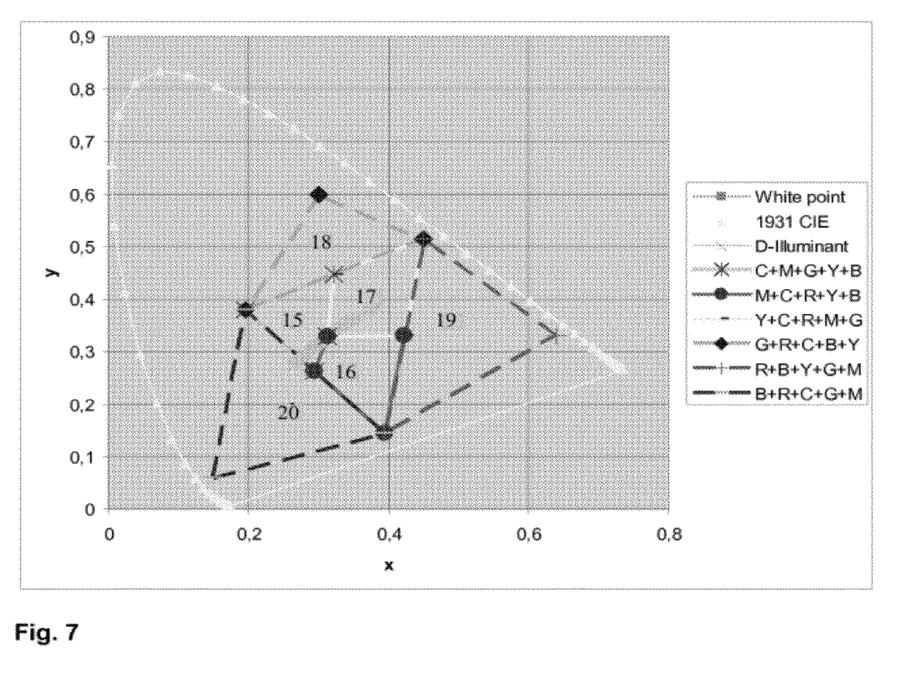
FIG. 7 is a representation of the colour gamut where the saturation of the secondary colours is increased with respect to the primary colours to achieve a wider colour gamut, as can be obtained in embodiments of the present invention.

In FIG. 7 it is illustrated that primary and secondary colours do not need to make up a triangle, it is also possible to trade-off saturation of the primary colours in favor of the saturation of the secondary colours. In that case also the brightness will be reduced, but the primary colours will show a higher relative intensity. The principle of colour mixing remains similar to what is described above.

The present invention also relates to a computer program product, when executed on a computing device, performing the methods and controlling as described above, and for a corresponding computer system. Furthermore a data carrier carrying corresponding software is also envisaged. Furthermore, the method also relates to a controller for controlling the system as described in the first aspect and second aspect.

The invention claimed is:

1. A display or projection system for displaying an image, the system comprising at least one light source; at least one micro-mirror device; and a dual total internal reflection prism arranged to guide light between the at least one light source and the at least one micro-mirror device, the dual total internal reflection prism having a first total internal reflection surface and a second total internal reflection surface oriented as a mirror image of the first total internal reflection surface.

2. The system according to claim 1, wherein the dual total internal reflection prism comprises a first total internal reflection surface and a second, different, total internal reflection surface.

3. The system according to claim 2, wherein the first total internal reflection surface is arranged to guide light from the at least one light source to the at least one micro-mirror device and wherein the second total internal reflection surface is arranged to guide light, not-selected to be imaged into the viewing direction by the micro-mirror device, outside the viewing path by total internal reflection.

4. The system according to claim 1, the system comprising at least two light sources and wherein the dual total internal reflection prism is arranged to guide light from both light sources to the same, at least one micro-mirror device.

5. The system according to claim 1, wherein the system is arranged to use the at least one micro-mirror device as a modulator to modulate a light beam to be imaged with image information and alternatively to select the light source from which light will be directed in the viewing direction.

6. The system according to claim 5, the system comprising a controller arranged to control the at least one micro-mirror device to enable said selecting.

7. The system according to claim 4, wherein the display system is configured to use
during at least a first period, a first total internal reflection surface of the dual total internal reflection prism to guide light from the first light source to the at least one micro-mirror device and a second total internal reflection surface of the dual total internal reflection prism to guide light, not-selected to be imaged into the viewing direction by the micro-mirror device, outside the viewing path,
while during at least a second period, the first total internal reflection surface and during at least a second period, the second total internal reflection surface is arranged to guide light from the second light source to the at least one micro-mirror device and the first total internal reflection surface is arranged to guide light, not-selected to be imaged into the viewing direction by the micro-mirror device, outside the viewing path.

8. The system according to claim 7, wherein the at least first period and the at least second period alternate with each other.

9. The system according to claim 1, wherein the system comprises a light source, a wavelength splitter arranged to split light from the light source into first and second lights, wherein the dual total internal reflection prism is arranged to guide the first light to the digital mirror device using a first total internal reflection surface of the dual total internal reflection prism and to guide the second light to the digital mirror device using a second total internal reflection surface of the dual total internal reflection prism.

10. The system according to claim 9, wherein the first light comprises a temporal sequence of primary colours, and the second light comprises a temporal sequence of the corresponding remaining part of a spectrum of the light from the light source.

11. The system according to claim 9, wherein the system comprises a controller for controlling the at least one micro-mirror device to enable timely selection of coupling of said first light or of said second light in the viewing direction.

12. The system according to claim 11, wherein the timely selection enables control of the brightness and/or colour coupled out.

13. The system according to claim 9, wherein for generating a specific colour, the first light is imaged for a first predetermined time and the second light is imaged for a second predetermined time.

14. A dual total internal reflection (TIR) prism for use within a projector with at least one micro-mirror device, the dual total internal reflection prism having a first total internal reflection surface and a second total internal reflection surface oriented as a mirrored image of the first total internal reflection surface.

15. A method for combining pulsed light sources within a projector with at least one micro-mirror device, where the micro-mirror device simultaneously performs the functions of selecting which of the pulsed light sources are output as an active light source and an imaging function, wherein the selecting comprises selecting each of the pulsed light sources for a portion of the time to provide the combining of the pulsed light sources.

16. A method for imaging an image with an imaging system, the method comprising using a micro-mirror device to select on a pixel basis between a first light source with a first light spectrum and a second light source with a second light spectrum, and using an associated colour mixing algorithm to select a predetermined brightness and colour saturation for the system.

17. A method for imaging an image with an imaging system, the method comprising using a micro-mirror device to select on a pixel basis between a first light beam comprising a temporal sequence of primary colours and a second light beam comprising a temporal sequence of the corresponding substantially complementary light in the first light beam and using an associated colour mixing algorithm to select a predetermined brightness and colour saturation for the display or projection system.

18. The method according to claim 17, wherein the second light comprises a temporal sequence of secondary colours.

19. The method according to claim 16, wherein the associated colour mixing algorithm is adapted to determine for a plurality of predetermined colours a combination of primary and secondary colours to be imaged for obtaining the predetermined colour saturation.

20. A controller for use in a projection or display system comprising at least one micro-mirror device, the controller being configured to control at least one micro-mirror device so as to perform the method of claim 16.

* * * * *